United States Patent [19]

Nottingham et al.

[11] 4,358,700
[45] Nov. 9, 1982

[54] REMOVABLE SLEEVE-TO-SHAFT INTERLOCK FOR A DYNAMOELECTRIC MACHINE

[75] Inventors: Lawrence D. Nottingham, Hempfield Township, Westmoreland County; Michael R. Jugan, Duquesne, both of Pa.

[73] Assignee: Westinghouse Electric Corp., Pittsburgh, Pa.

[21] Appl. No.: 130,491

[22] Filed: Jan. 13, 1980

[51] Int. Cl.³ .............................................. H02K 3/50
[52] U.S. Cl. ................................... 310/262; 310/270
[58] Field of Search ............... 310/261, 262, 270, 216

[56] References Cited

U.S. PATENT DOCUMENTS

| 1,175,100 | 3/1910 | Werner | 403/350 |
|---|---|---|---|
| 2,712,085 | 6/1955 | Willyoung | 310/262 |
| 2,769,934 | 11/1956 | Stone et al. | 310/261 |
| 2,783,069 | 2/1957 | Wightman | 287/52 |
| 2,836,445 | 5/1958 | Baudry | 310/262 |
| 2,937,042 | 5/1960 | Wilder, Jr. | 287/126 |
| 3,164,402 | 1/1965 | Jobe | 287/52.05 |
| 3,258,624 | 6/1966 | Turk | 310/261 |
| 3,326,580 | 6/1967 | Munier et al. | 285/27 |
| 3,395,299 | 7/1968 | Quay et al. | 310/261 |
| 3,470,404 | 9/1969 | Averman et al. | 310/42 |
| 3,476,966 | 11/1969 | Willyoung | 310/270 |
| 3,614,498 | 10/1971 | Bank et al. | 310/262 |
| 3,663,850 | 5/1972 | Phelon | 310/153 |
| 3,694,906 | 10/1972 | Rank et al. | 29/598 |
| 3,822,953 | 7/1974 | Adelizzi | 403/356 |
| 4,091,301 | 5/1978 | Blank | 310/270 |

*Primary Examiner*—Donovan F. Duggan
*Attorney, Agent, or Firm*—William David Lanyi

[57] ABSTRACT

Herein presented and claimed is a removable sleeve-to-shaft interlock for a dynamoelectric machine. The invention comprises: a shaft having a groove about its outer circumferential surface; a sleeve having a central bore for receiving said shaft therethrough, said sleeve having an eccentric groove about its inner circumferential surface; at least one detent, said detent being an arcuate spring having an associated radius smaller than the radius of the shaft and an asociated height greater than the depth of the shaft groove, said detent depressible during assembly and disassembly; and means for circumferentially positioning said detent in the shaft groove, for example at least one spacer having at least one protrusion which mates with a similarly shaped channel in the non-eccentric groove. After assembly the detent straddles the interface between the shaft and the sleeve, being within both of the grooves simultaneously, thereby preventing axial movement of the sleeve relative to the shaft.

11 Claims, 12 Drawing Figures

REMOVABLE SLEEVE-TO-SHAFT INTERLOCK FOR A DYNAMOELECTRIC MACHINE

BACKGROUND AND SUMMARY OF THE INVENTION

This invention relates to a rotor of a dynamoelectric machine, and more particularly to means for preventing axial movement between a retaining ring and an end plate of a generator's rotor.

Many ways are known for securing a tubular sleeve to a cylindrical shaft. Some of these are designed to prevent relative rotation or transmit torque while others prevent relative axial movement. Keys, splines, pins and other similar retainers are generally used to secure elements such as gears or pulleys to shafts so that torque can be transferred between them or relative rotation prevented. Relative axial motion between a sleeve and a shaft is generally prevented by means such as a press or shrink fit between the parts, or set screws, pins, cotters or rings. All of these have distinct disadvantages for certain applications. For example, with very large parts heat-shrinking can require excessively high temperatures, especially in disassembling the sleeve from the shaft. Use of any type of pin typically requires a hole drilled or machined into the parts to be assembled. This can produce undesirably high stress concentrations under many operating conditions. The same disadvantage is suffered in the use of split rings or other retaining devices that typically require holes for assembly or disassembly tooling.

Desirable therefore is a device and method to interlock a sleeve with a shaft; a method which overcomes these disadvantages.

According to the invention a shaft is provided with a groove about its outer circumferential surface. A sleeve, having a central bore for receiving said shaft therethrough, has an eccentric groove about its inner circumferential surface. At least one detent is provided, said detent being an arcuate spring having an associated radius smaller than the radius of the shaft groove, a material thickness less than the depth of the shaft groove, and a height greater than the depth of the shaft groove. The detent is depressible during assembly and disassembly. The detent is positioned circumferentially about the shaft groove by spacers, so that its location can be positively identified for later disassembly.

During assembly the detent is positioned in, for example, the groove in the shaft. The sleeve is slid over the shaft, and over the positioned detent by depressing the detent into the shaft's groove. Once the sleeve is properly positioned over the detent, the detent's spring action resulting from its smaller radius causes the detent to spring into the sleeve's groove, straddling the interface between the shaft and the sleeve, and thereby preventing axial motion of the sleeve relative to the shaft.

During disassembly, with a four position eccentric groove as an example, the shaft is rotated 45 degrees relative to the sleeve. This positions the detent in radial alignment with a section of the eccentric groove in which the groove's depth is substantially zero. Thus, the rotation of the parts depresses the detent into the non-eccentric groove and permits the sleeve and shaft to be slid apart.

DESCRIPTION OF THE DRAWINGS

The invention will be more fully understood from the following detailed description taken in connection with the accompanying drawings, in which.

DESCRIPTION OF THE PREFERRED EMBODIMENT

Figure 1:
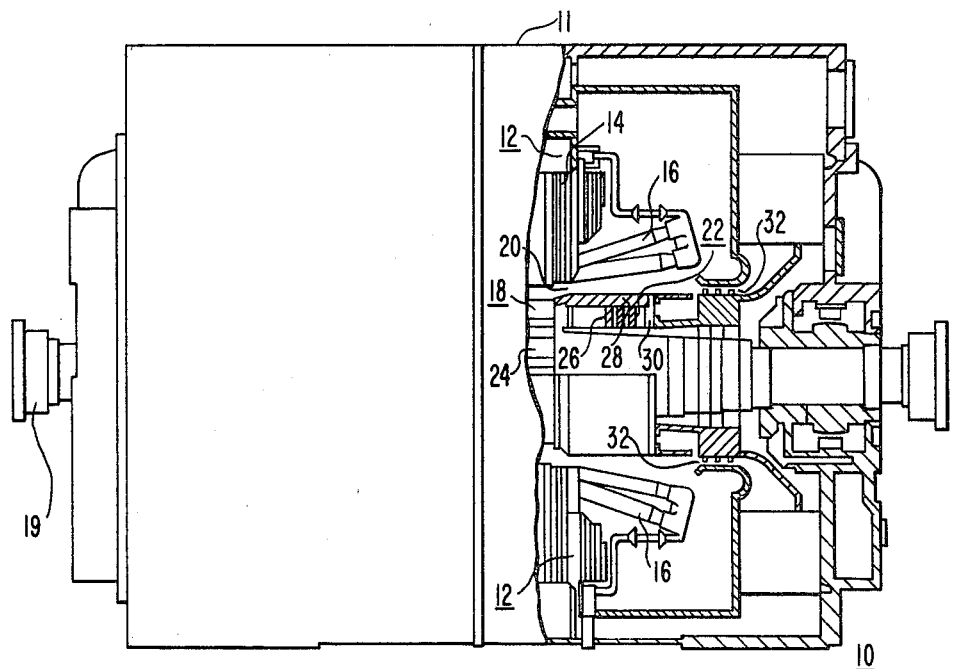
FIG. 1 is a diagrammatic view of a dynamoelectric machine partially cut-away.

Throughout the description which follows, like reference characters refer to like elements on all the figures. FIG. 1 shows a typical construction for a large dynamoelectric machine 10 such as a generator. Contained within a housing 11, a generally tubular-shaped stator assembly 12 includes a laminated ore 14, and a stator winding 16 disposed within said core 14. A generally cylindroid-shaped rotor assembly 18 is axially and rotatably mounted on a rotor shaft 19 within said stator 12. An air gap 20 (a name standardly used whether or not air is the coolant) is the space between the outer circumference of said rotor 18 and the inner circumference of said stator 12. A regulated volume of coolant such as hydrogen gas can be circulated through the air gap 20 to assist in cooling the stator 12 and outer region of the rotor assembly 18 during operation of the machine 10.

Figure 2:
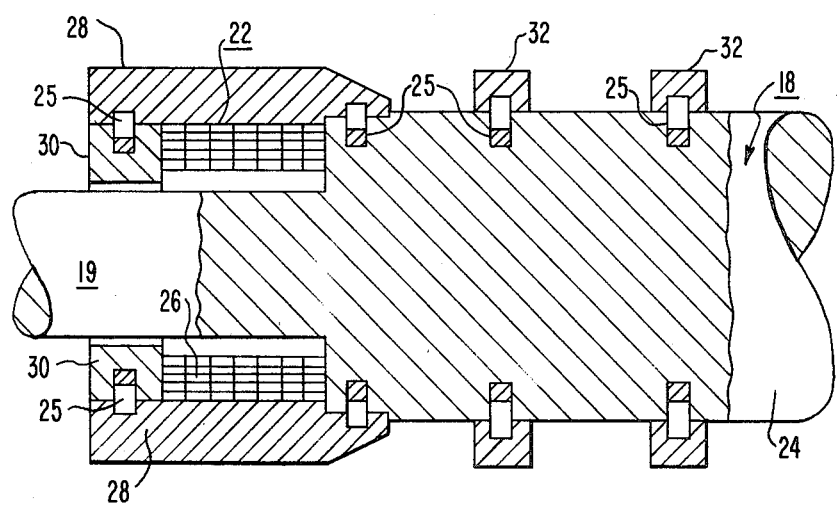
FIG. 2 is a detailed diagrammatic view of a portion of a rotor assembly.

Referring to FIG. 2, the rotor assembly 18 includes a winding 22 which comprises conductors which extend generally axially through one of the slots in the rotor core 24, and protrude beyond the rotor core 24 to turn and pass through another slot. The portion of the winding at the ends of the rotor core 24 are descriptively called "end turns" 26. The end turns 26 are subject to, for example, centrifugal forces which necessitates the use of a retaining ring 28 or other means to contain the end turns 26 from radial movement. The retaining ring 28 is a cylindroid which is disposed about and radially outward of the rotor end turns 26. An end plate 30 is an annulus having a central bore which is fitted within the bore of the retaining ring 28 and has the function of stiffening the retaining ring 28 to minimize oval-shaped deformation due to, for example, circumferentially non-uniform loading from the rotor winding 22 and the retaining ring 28. A plurality of baffle rings 32 provide barriers which are used in creating high- and low-pressure zones for the circulation of cooling medium and therefore regulate the flow of coolant through the air gap 20 of the generator 10. A plurality of interlocks 25 are provided to axially secure the various parts of the rotor assembly 18.

As the rotor speed is increased from standstill to operating speed, the rotating rotor assembly 18 shortens and the rotor windings 22 tend to elongate due to Poisson's effect. In addition, as excitation is applied and the temperature rises, the windings 22 elongate relative to the rotor core 24. These and other conditions create an axial force on the end plate 30 in a direction which would tend to push the end plate from under the retaining ring 28, and the retaining ring 28 off the rotor core 24 were they not secured. It is the purpose of this invention to provide means for securing these or similar parts from relative axial movement.

Figure 3:
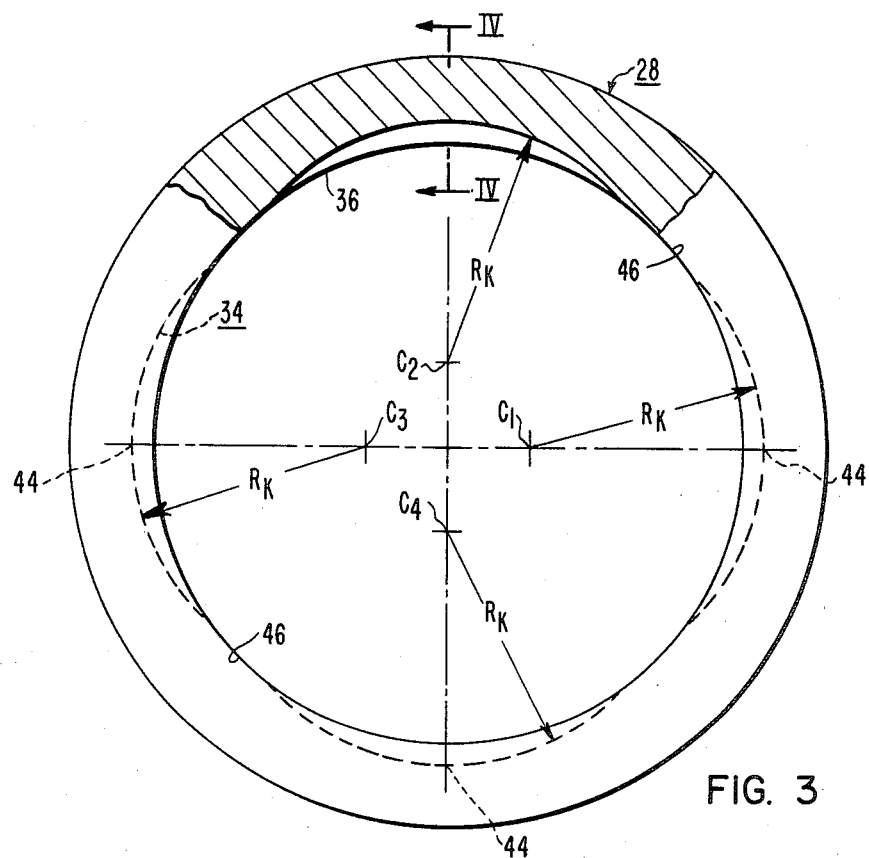
FIG. 3 is a simplified cross-sectional view of the retaining ring shown in FIG. 1, having an eccentric groove in its inner circumferential surface of its bore.

FIG. 3 shows a simplified axial view of the retaining ring 28 shown in FIG. 2. It should be understood that this retaining ring 28, for the purposes of teaching the invention, shall be used as an example of an "outer ring" or sleeve as that nomenclature is used in this specification. In accordance with the invention, the sleeve 28 is provided with a groove 34 along its inner circumferential surface 36. This may also be called the bore surface. As shown in FIG. 3, the groove 34 is eccentric; being shaped somewhat like a "four-leaf clover" in the drawings, with each so-called "leaf" having a radius $R_K$ from center points C1–C4, as designated on the drawings.

Figure 4:
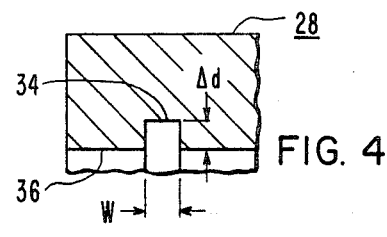
FIG. 4 is a partial cross-sectional view along line IV—IV of FIG. 3.

FIG. 4 shows a partial sectional view showing the eccentric groove, taken along line IV—IV of FIG. 3. It can be seen that the sleeve's groove 34 has a width "W" in the axial direction, and a depth into the sleeve 28 of $\Delta d$. As can be understood best from FIG. 3, since the groove 34 is eccentric, $\Delta d$ varies along its circumference. As shown, for example, $\Delta d$ varies from a maximum depth to a minimum depth equal to zero at four different points along the circumference of the groove 34. Thus the drawing can be said to depict a "four-position" eccentric groove; a groove having four maxima locations 44 (the portions of the eccentric groove 34 in which $\Delta d$ is greatest) and four zero locations 46 (the portions of the eccentric groove 34 in which $\Delta d$ is substantially zero).

Figure 5:
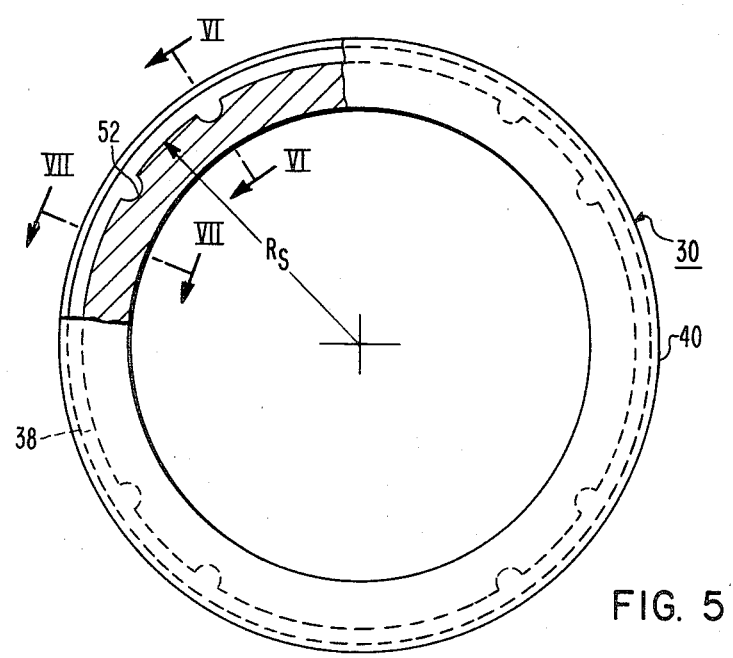
FIG. 5 is a simplified diagrammatic view of the end plate, shown in FIG. 1, having a groove in its outer circumferential surface.
Figure 7:
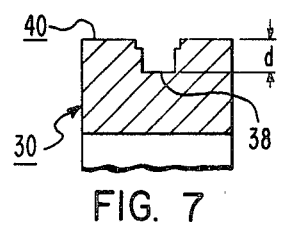
FIG. 7 is an enlarged cross-sectional view taken along line VII—VII of FIG. 5.
Figure 6:
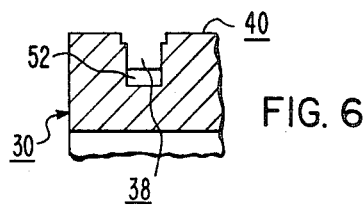
FIG. 6 is an enlarged cross-sectional view taken along line VI—VI of FIG. 5.

FIGS. 5–7 depict an end view of the end plate 30 as shown in FIG. 2 with appropriate cross-sectional views. It shold be understood that the end plate 30 is chosen as an example of the "inner ring" or cylindrical "shaft ring" in the invention as that nomenclature is used. As shown in the figure, the shaft ring 30 has a groove 38 along its outer circumferential surface 40. The shaft groove 38, for example, has a "T" shaped cross-section. The bottom surface of groove 38 is concentric with the shaft's outer surface 40, and has a width, for example, equal to the width of the sleeve's groove 34. The wider (top) part of groove 38 has a width, for example, greater than width "W".

Figure 11:
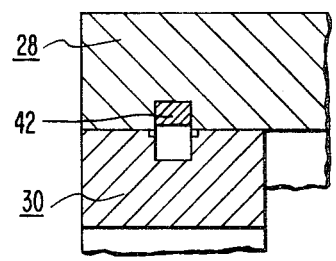
FIG. 11 is an enlarged cross-sectional view taken along line XI—XI of FIG. 9, and showing the detent in the assembled interlock system.
Figure 8:
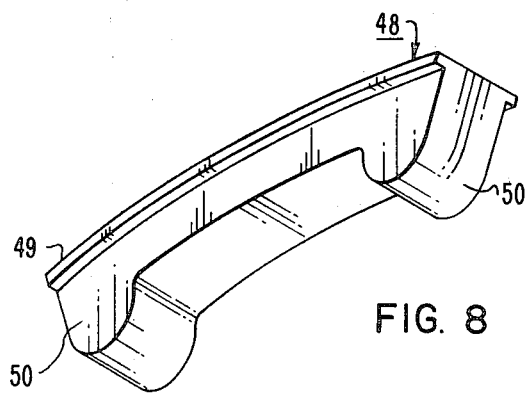
FIG. 8 is a perspective illustration of a spacer.
Figure 9:
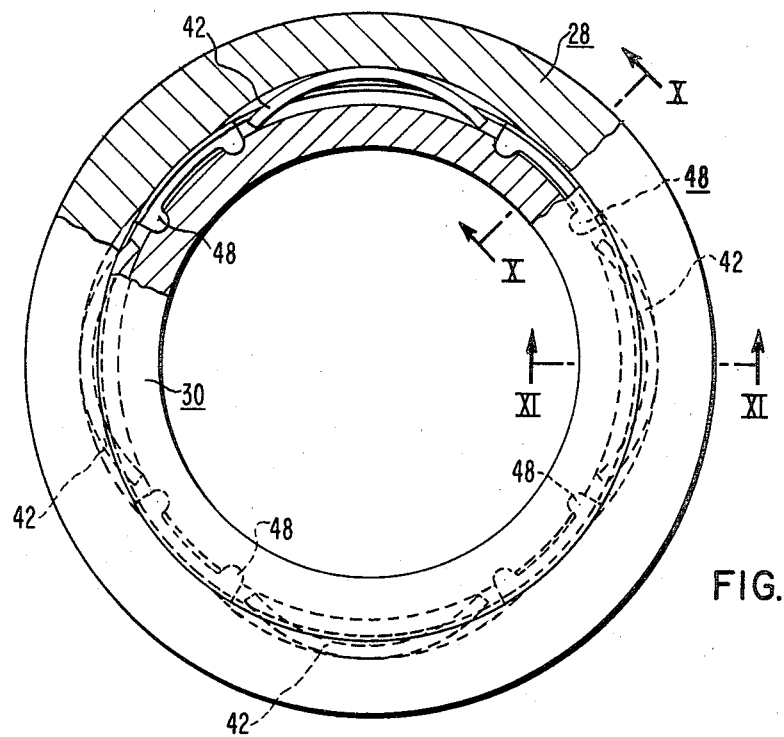
FIG. 9 is a diagrammatic view of the interlock system employing the invention, as it would appear in assembled form during operation of the machine.
Figure 12:
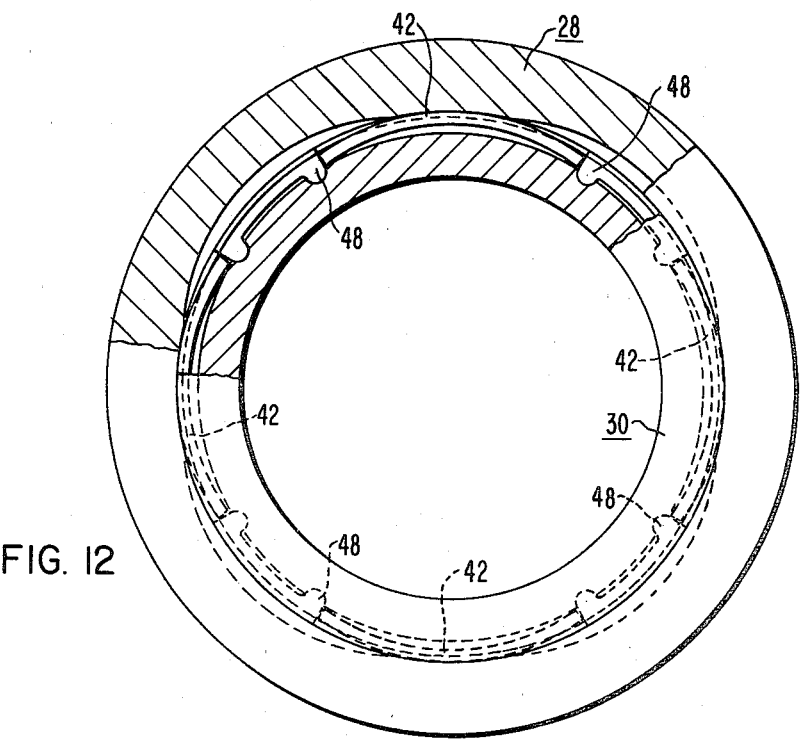
FIG. 12 is a diagrammatic view of the interlock system employing the invention as it would appear in rotated position ready for disassembly.

FIGS. 9, 11 and 12 show a preferred geometry of a detent 42 as employed in this invention. A detent 42 is an arcuate spring having an associated radius designated $R_d$ from a center point $C_d$; said radius being smaller than the radius associated with the bottom surface of the shaft groove 38, designated $R_s$ in FIG. 5. The detent 42, for example, has a rectangular cross-section with a width less than axial width "W" so that the detent 42 is sized to fit into both the narrower portion of the shaft groove 38, and the sleeve's groove 34. The detent 42 is depressible during the assembly and disassembly operations. This means the detent 42 can be distorted from the configuration or geometry shown in FIG. 8 in such manner as to produce a larger radius $R_d$ when the detent 42 is under a radially inwardly directed force. Under such a condition the "H" height of the detent 42 is reduced or lessened. Absent such a force, the detent assumes a height which must be greather than the depth of either the non-eccentric groove 38 or the eccentric groove 34 at its maxima locations 44. Furthermore, the material thickness of the detent 42 must be less than the depth of the shaft groove 38. During disassembly the detent 42 is depressed by any technique such as that discussed below, until "H" is equal to dimension "d" shown in FIG. 7. FIG. 7 is a sectional view taken along line VII—VII of FIG. 5. When these dimensions are equal, the sleeve 28 can be moved relative to the shaft ring 30 by merely sliding one relative to the other. This shall be explained more fully below.

A preferred technique for depressing or maintaining depression of the detent 42 during assembly and disassembly is to have an eccentric groove, eccentric relative to the circumferential surfaces 36, 40, as was discussed above in reference to FIG. 3. In FIG. 3 the groove is provided with four maxima locations 44. It should be understood, however, that any number of these maxima locations 44 may be provided. Preferably, they should number for example two, three or four so as to provide a sufficiently balanced and positive interlock between the sleeve 28 and the shaft ring 30.

Assembly or disassembly operations need follow the following procedure. In assembly the detent 42 is maintained in its depressed geometry within the groove 38 in the shaft ring 30. The sleeve 28 is positioned over the shaft ring 30 so as to have its groove 34 axially in juxtaposition with the groove 38 in the shaft ring 30. If one of the zero location 46 is circumferentially positioned over the detent 42, then it will maintain the detent 42 in its depressed geometry until subsequent rotation of the shaft ring 30 relative to the sleeve 28 circumferentially aligns one of the maxima locations 44 of the eccentric groove 34 with the detent 42, and thus permits the detent 42 to spring back into the geometry shown in FIG. 9. If after the sleeve 28 is positioned over the shaft ring 30 one of the maxima locations 44 is circumferentially positioned over the detent 42, then it will immediately spring to its full height as soon as the grooves are juxtaposed. With a two-position eccentric groove (i.e., an eccentric groove having two zero locations 46 and two maxima locations 44) the sleeve 28 need only be rotated 90 degrees relative to the shaft ring 30 in order to allow the detent 42 to spring to its full height. A four-position eccentric groove requires a rotation of 45 degrees to accomplish the same. With the detent at its full height within the assembly, the rings are substantially prevented from relative axial movement. It should be understood, of course, that a certain amount of play due to needed assembly and manufacturing tolerances does occur in the assembly. Disassembly proceeds along the same steps as the assembly except in reverse order.

Figure 10:
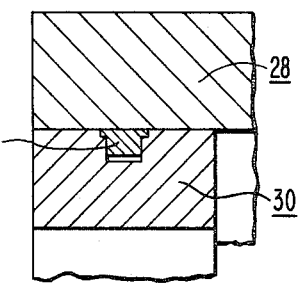
FIG. 10 is an enlarged cross-sectional view taken along line X—X of FIG. 9, and showing the spacer in the assembled interlock system.

During assembly and disassembly, it has been found that the detent 42 may be subject to rotational movement along the non-eccentric groove 38. A means for positioning the detent 42 is therefore herein provided. A spacer 48 is shown in FIGS. 9 and 10 to have at least one protrusion 50 (two are shown) that mates with a similarly shaped channel 52 in the groove 38 which is shown in FIG. 5. In a preferred geometry, the spacer 48 has a "T" shaped cross-section, similar to the cross-section in the shaft groove 38, but with bulbous protrusions, each designated 52, at each end. The wider portion 49 of the spacer 48 has a width which prevents the spacer 48 from entering the sleeve's groove 34. Thus the spacer 48 will not interfere with the rotation of the eccentric groove 34. Any geometry which achieves this while at the same time prevents rotation of the detent 42 is within the purview of the invention. For example, the spacer may have a tapered body with the wider portion having a width greater than "W". With such a spacer geometry, the shaft groove 34 may likewise be tapered. In the assembly operation incorporating a spacer 48, each spacer 48 is positioned in the groove 38 so as to have the protrusion 50 mate with channel 52. Next each detent 42 is positioned between two adjacent spacers. The detents are then depressed so as to permit the sliding of the sleeve 28 relative to the shaft ring 30 thereby positioning their respective grooves in juxtaposition. This can be accomplished, for example, by banding (as with a steel band, not shown) the detent into its depressed configuration. As the sleeve 28 is slid relative to the shaft ring 30 it reaches a point at which time it too forces continued depression of the detent 42. At that time the banding (not shown) is removed, and the sleeve 28 can continue to be slid until it is properly positioned. Its rotation thereafter permits the detent 42 to spring out into the space provided in the eccentric groove 34. It should be understood that in the assembly or disassembly operation the relative sliding of the sleeve 28 over the shaft ring 30 is equivalent to sliding the shaft 30 through the sleeve 28. The same is true with respect to the rotation step of the above described procedure.

Now turning to the remaining figures, FIG. 10 is a diagrammatic view of a preferred embodiment of the interlock system employing the invention as it would appear in assembled form. Note that the cutaway in the figure shows the detent 42 at its full height in the grooves. Note also that the drawing depicts a four position eccentric groove 34 with four detents and four spacers.

FIG. 12 is a diagrammatic view of the interlock system as shown in FIG. 10, except that it is shown in rotated position ready for disassembly.

METHOD AND OPERATION

A method is herein presented and claimed for preventing relative axial movement between a tubular sleeve 28 having a central bore and a shaft mountable within said bore. Referring again to the drawings, the steps are as follows. At least one detent 42 is positioned within a groove 38 in the outer circumferential surface 40 of the shaft 30. The detent 42 is an arcuate member having associated radius and height; said radius being less than the radius of the shaft groove 38 and said height being greater than the depth of the shaft groove 38. The material thickness of the detent 42 must be less than the depth of the shaft groove 38. The detent 42 is maintained in a depressed configuration such that its depressed height is no more than the depth of the shaft groove 38 in which it is positioned. This step is continued until the shaft 30 is mounted in the sleeve 28. The mounting, achieved with an axial sliding motion, radially juxtaposes an eccentric groove 34 and said detent 42. This eccentric groove 34 is located in the inner circumferential surface 36 of the sleeve 28. A maxima location 44 of said eccentric groove 34 and said detent 42 are radially juxtaposed. This permits the detent 42 to spring into both grooves substantially simultaneously, thereby preventing relative axial movement between the sleeve 28 and the shaft 30. It is important to note that subsequent to this assembly the sleeve 28 must be prevented from rotation relative to the shaft 30 until disassembly is desirable. Furthermore, an additional step is the preventing of circumferential displacement of the detent 42 after it is positioned within the shaft groove 38 in assembly. The steps above are further described elsewhere in the specification.

In summary, the combination of detents, spacers, shaft ring, and sleeve provide an interlock system that secures each ring from axial movement relative to the other. As examples, the invention can be used to interlock the retaining ring to the end plate, the retaining ring to the rotor core, or the baffle ring to the rotor core. It should now be apparent that a removable sleeve-to-shaft interlock has been provided for use in a dynamoelectric machine.

We claim:

1. In combination:
   (A) a shaft having a groove about its outer circumferential surface;
   (B) a sleeve having a central bore for receiving said shaft therethrough, said central bore having an eccentric circumferential groove about its inner surface;
   (C) at least one detent, said detent being an arcuate spring having an associated radius smaller than the radius of said groove in said shaft, an associated height greater than the depth of said groove in said shaft, said detent being depressible during assembly and disassembly; and
   (D) means for circumferentially positioning said detent in said groove in said shaft including at least one spacer which has a geometry which prevents said spacer from rotating circumferentially about said shaft and from interfering with the rotation of said sleeve relative to said shaft;
   whereby after assembly said detent straddles the interface between said shaft and said sleeve, being within both of said grooves simultaneously, thereby preventing axial movement of said sleeve relative to said shaft.

2. The combination of claim 1 wherein said spacer includes at least one protrusion that mates with a similarly shaped channel in said groove in said shaft.

3. The combination of claim 2 wherein said eccentric groove is a four position eccentric groove and wherein the combination includes four detents and four spacers.

4. The combination of claim 1 wherein said sleeve is a retaining ring of a dynamoelectric machine and said shaft is an end plate of a dynamoelectric machine.

5. The combination of claim 2 wherein said groove in said shaft has a "T" shaped cross-section, said detent has a rectangular cross-section, and said spacer has a "T"shaped cross-section with a bulbous protrusion at each end; whereby said spacer fits into said groove in said shaft and its protrusions fit into channels in the shaft groove, and the wider part of the spacer prevents it from entering said groove in said sleeve.

6. A dynamoelectric machine comprising:
   a generally cylindrical shaft having a circumferential groove in its outer surface;

a sleeve having a central bore shaped to receive said shaft, said bore having a circumferential groove in its inner surface, said groove being eccentric to said sleeve;

a detent, said detent being an arcuate spring having an associated radius of curvature which is less than the radius of curvature of said groove in said shaft, said detent having an associated height greater than the depth of said groove in said shaft and a material thickness less than the depth of said groove in said shaft, said detent having a material width less than the width of said groove in said shaft and less than the width of said groove in said sleeve, said detent being compressable during assembly and disassembly to a radius of curvature substantially equal to the radius of curvature of said groove in said shaft; and means for preventing said detent from moving circumferentially around said shaft.

7. The dynamoelectric machine of claim 6, wherein: said preventing means is a spacer shaped to fit in said groove in said shaft, said spacer being shaped to allow said sleeve to rotate relative to said shaft.

8. The dynamoelectric machine of claim 7, wherein: said spacer is shaped such that its circumferential position relative to said shaft is fixed.

9. The dynamoelectric machine of claim 6, wherein: said eccentric groove in said sleeve has four maxima locations and four minima locations and four detents are disposed within said groove in said shaft.

10. The dynamoelectric machine of claim 6, wherein: said sleeve is a retaining ring and said shaft is an end plate of a rotor.

11. The dynamoelectric machine of claim 6, wherein: said sleeve is a retaining ring and said shaft is a rotor.

* * * * *